US006279730B1

(12) United States Patent
Schreger et al.

(10) Patent No.: US 6,279,730 B1
(45) Date of Patent: Aug. 28, 2001

(54) ARRANGEMENT FOR THE MOVEMENT OF PRODUCTION GOODS ALONG A PRODUCTION LINE

(75) Inventors: Adolf Schreger, Pinneberg; Manfred Wittenstein, Mergentheim, both of (DE)

(73) Assignees: Jenoptik Aktiengesellschaft, Jena; Wittenstein Motion Control GmbH, Igersheim, both of (DE)

( * ) Notice: Subject to any disclaimer, the term of this patent is extended or adjusted under 35 U.S.C. 154(b) by 0 days.

(21) Appl. No.: 09/294,478

(22) Filed: Apr. 20, 1999

(30) Foreign Application Priority Data

Apr. 21, 1998 (DE) ........................................ 198 17 713
Apr. 24, 1998 (DE) ........................................ 198 18 522

(51) Int. Cl.[7] ........................................ B65G 35/00

(52) U.S. Cl. .................... 198/722; 198/782; 244/137.1; 414/535

(58) Field of Search .............................. 198/782, 783, 198/722; 244/137.1; 414/535

(56) References Cited

U.S. PATENT DOCUMENTS

| | | | |
|---|---|---|---|
| 3,709,450 * | 1/1973 | Watts et al. | 244/118 |
| 3,978,975 | 9/1976 | Herbes et al. . | |
| 4,589,542 | 5/1986 | Steadman . | |
| 5,042,645 * | 8/1991 | Pritchard | 198/782 |
| 5,183,150 * | 2/1993 | Chary et al. | 198/782 |
| 5,547,069 | 8/1996 | Pritchard . | |
| 5,803,234 | 9/1998 | Podkanski et al. . | |

FOREIGN PATENT DOCUMENTS

| | | |
|---|---|---|
| 39 11 214 | 1/1991 | (DE) . |
| 39 42 381 | 1/1991 | (DE) . |
| 41 36 972 | 5/1993 | (DE) . |
| 69107605 | 6/1995 | (DE) . |
| 196 08 236 | 5/1997 | (DE) . |
| 4427696 | 6/1997 | (DE) . |
| 19807230 | 9/1999 | (DE) . |
| 19807229 | 12/1999 | (DE) . |
| 0481587 | 4/1992 | (EP) . |
| 0512672 | 11/1992 | (EP) . |
| 2291848 | 7/1996 | (GB) . |

* cited by examiner

*Primary Examiner*—Thomas J. Brahan
(74) *Attorney, Agent, or Firm*—Reed Smith LLP

(57) ABSTRACT

An arrangement for conveying material to be conveyed along a conveying plane, in particular for freight-loading systems in freight compartments, preferably of aircraft is disclosed. The arrangement provides that driving material to be conveyed along a conveying plane, with which safe, reliable transport of the material to be conveyed is ensured with low wear of the conveying roller under widely varying operating conditions. This is achieved in that, in a drive unit, the conveying roller is connected to a first drive and an associated first activating unit for producing a requisite traction force for moving the material to be conveyed along the conveying plane. There is a second drive having an associated second activating unit for producing an adequate pressure force of the conveying roller against the material to be conveyed, and control electronics part is provided, which coordinates the two drives, which can be activated independently of one another, as a function of a motion state of the material to be conveyed. The motion state is detected at least by the internal sensor unit, is designed as a self-testing device.

13 Claims, 6 Drawing Sheets

ARRANGEMENT FOR THE MOVEMENT OF PRODUCTION GOODS ALONG A PRODUCTION LINE

BACKGROUND OF THE INVENTION a) Field of the Invention

The invention relates to an arrangement for moving material to be conveyed along a conveying plane, in particular for freight-loading systems in freight compartments, preferably of aircraft.

b) Description of the Related Art

So-called roller drives, which are fully described in German Patent 41 36 972, are known for the transport of loads in aircraft freight compartments. In this case, a conveying roller, which is connected to a drive, is controlled in its rolling motion by virtue of the fact that sensors detect the position of material to be transported above the conveying module driving the conveying roller and thus switch the drive on or off as required. A disadvantage in this case is that there are no measures for realizing different pressure forces. However, these are necessary in order to be able to safely move and/or stop all sorts of freight and to design such a drive in such a way that it is safe in operation and functions free of maintenance for long operating periods.

Furthermore, DE 196 08 236 C1 has disclosed a roller drive unit for the transport of freight containers in which the drive roller is simultaneously lifted, by the motor driving the drive roller, by means of a cam and pressed against the material to be conveyed.

A roller drive unit described in DE 39 11 214 C3 works in a similar manner, which roller drive unit, by means of an intermediate gear running in the roller interior and having a braking device, taps the pressure force from the drive motor, the drive axis of which lies eccentrically in the roller interior relative to the roller. In this type of conveying roller drive, the pressure force depends on the rotary drive of the conveying roller, as a result of which the pressure force cannot be set to a value suitable for the respective material to be conveyed. The consequences are increased wear and a relatively short operating period.

OBJECT AND SUMMARY OF THE INVENTION

The object of the invention is to find a novel means of moving material to be conveyed, with which safe, reliable transport of the material to be conveyed is ensured with low wear of the conveying roller under widely varying operating conditions.

According to the invention, the object, in an arrangement for moving material to be conveyed along a conveying plane, which is formed by driveless running rollers serving to carry and guide material to be conveyed, having a drivable conveying roller, which is arranged between the driveless running rollers, and control electronics for controlling a drive driving the conveying roller, is achieved in that the conveying roller is connected to a first drive and an associated first activating unit for producing a requisite traction force for moving the material to be conveyed along the conveying plane, there is a second drive having an associated second activating unit for producing an adequate pressure force of the conveying roller against the material to be conveyed. The control electronics coordinate the two drives, which can be activated independently of one another.

In such an arrangement, it is advantageous if the conveying roller, in the form of a hollow cylinder, is mounted on a cylindrical supporting body such that it can rotate about the axis of symmetry of the latter, the first drive is connected to the conveying roller via a gear unit located inside the supporting body, the supporting body is mounted such that it can rotate about an eccentric axis running parallel to its axis of symmetry, and the second drive is coupled to the supporting body for pivoting the supporting body about its eccentric axis and for pressing the conveying roller against the material to be conveyed on the conveying plane.

The control-electronics part advantageously contains a sensor unit for detecting the material to be conveyed and a self-testing device, which controls the two independent drives as a function of a motion state of the material to be conveyed, which motion state is detected at least by means of the internal sensor unit.

Gear trains are expediently used in each case for the transmission of force from the first drive to the conveying roller and from the second drive to the supporting body.

In this case, the gear unit driving the conveying roller advantageously has a pinion, which is mounted in the eccentric axis of the cylindrical supporting body, is connected to the first drive and lies inside the cylindrical supporting body, and there is an output gear, which is mounted radially between this pinion and the conveying roller so as to be rotatable in an axially parallel manner and projects radially outward beyond the supporting body and meshes with a region of the conveying roller which is designed as an internal gear.

The gear unit driving the conveying roller, between the first drive and the conveying roller, is preferably designed, at least in one section, as an epicyclic gear unit.

It proves to be especially advantageous that the gear unit driving the conveying roller and having the epicyclic gear unit, and the first drive are arranged inside the supporting body, the sun gear of the epicyclic gear unit being arranged on the axis of symmetry of the supporting body, and the planet gears meshing with a region of the conveying roller which is designed as an internal gear.

The gear unit for pivoting the supporting body, between the second drive and the supporting body, is likewise advantageously designed, at least in one section, as an epicyclic gear unit.

It proves to be expedient that the drive torque of at least the second drive can be regulated in order to set predeterminable pressure forces of the conveying roller against the material to be conveyed.

It is especially advantageous if the first and the second drives are designed as variable-speed servomotors. To this end, brushless direct-current motors are especially suitable as first and second drives.

The self-testing device contained in each drive unit is expediently connected to the sensor unit, in which case, via the activating units, as a function of the detected stationary or moving state of the material to be conveyed, alternatively the second drive can be activated first before the first drive is switched on or the first drive can be activated first before the second drive is switched on.

The self-testing device, for the purpose of the satisfactory overall functioning of a system of drive units, is advantageously connected to a central unit via connections for the transmission of obtained data (such as pressure force, traction force, sensor function and rotary speed of the conveying roller).

At the same time, anti-slip control means are expediently provided in the self-testing device, in which case, via the central unit, by means of the data obtained from various drive units, the knowledge of the exact distances between the drive units and the knowledge of the rotary speed of the conveying roller and the actual transport speed of the material to be conveyed, slip which arises can be compensated for by a specific increase in the pressure force.

The invention is based on the general idea of using drives which are independent of one another for the rotation and the applied pressure of the conveying rollers. To this end, interaction with the sensor unit and a control-electronics part is provided for the coordination of the two drives, the drives being activated and controlled in keeping with the requirements. For the proper interplay of a plurality of drive units, data exchange and control coordination with a central unit are to be provided.

With the arrangement according to the invention, it is possible to set the pressure force and the traction force of the conveying roller as a function of the detected motion state of the material to be conveyed and to reduce the wear of the conveying roller. Furthermore, the material to be conveyed, if need be, may be moved in opposite directions under a defined pressure force of the conveying roller, in the course of which accelerations and decelerations are possible. In particular, the material to be conveyed, when stopped, may also be secured by means of the conveying roller against displacement in the conveying direction. In addition, the pressure force of the conveying roller against the material to be conveyed is kept at a constant value in the event of unevenness in the contact surface of the material to be conveyed.

The invention is to be explained in more detail below with reference to an exemplary embodiment.

DESCRIPTION OF THE PREFERRED EMBODIMENTS

Figure 1:
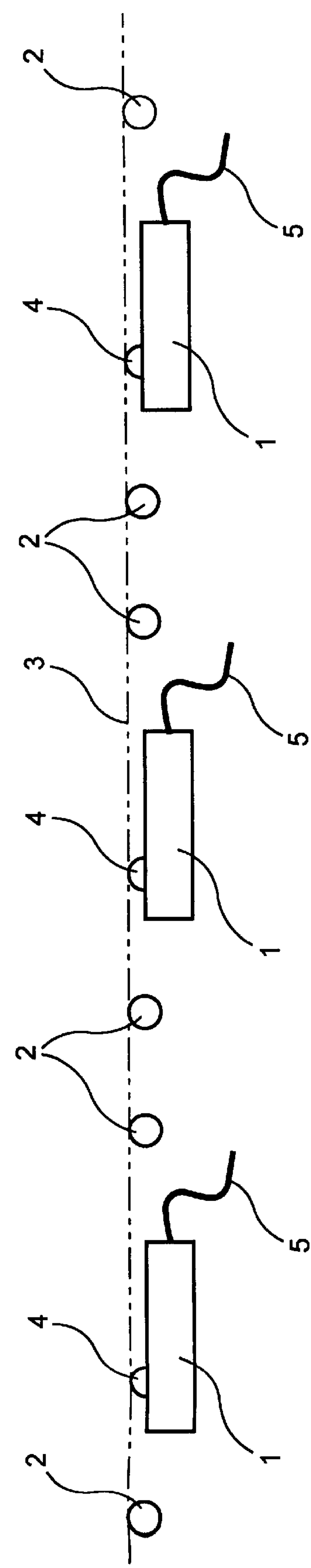
FIG. 1 shows the basic construction of a freight-loading system.

The essential components of a freight-loading system, as an expedient use of the invention, can be seen in FIG. 1. In this case, the central components are the drive units 1, which are arranged in a distributed manner between driveless running rollers 2 in each case at defined distances from one another over the entire transport distance. In this case, the exact distances between the drive units 1 are preferably stored in a central unit (not shown), the individual drive units 1 in each case having connections 5 to this central unit.

In a freight-loading system, the running rollers 2 perform the essential carrying function for the material to be conveyed and define a so-called transport or conveying plane 3. Relative to this conveying plane 3, the drivable conveying rollers 4 of the drive units 1 are lowered in the rest state, i.e. in the de-energized state of the conveying-roller drive, so that they do not project beyond the conveying plane 3 and do not get in the way if the material to be conveyed is transported manually along the conveying plane 3.

Figure 2:
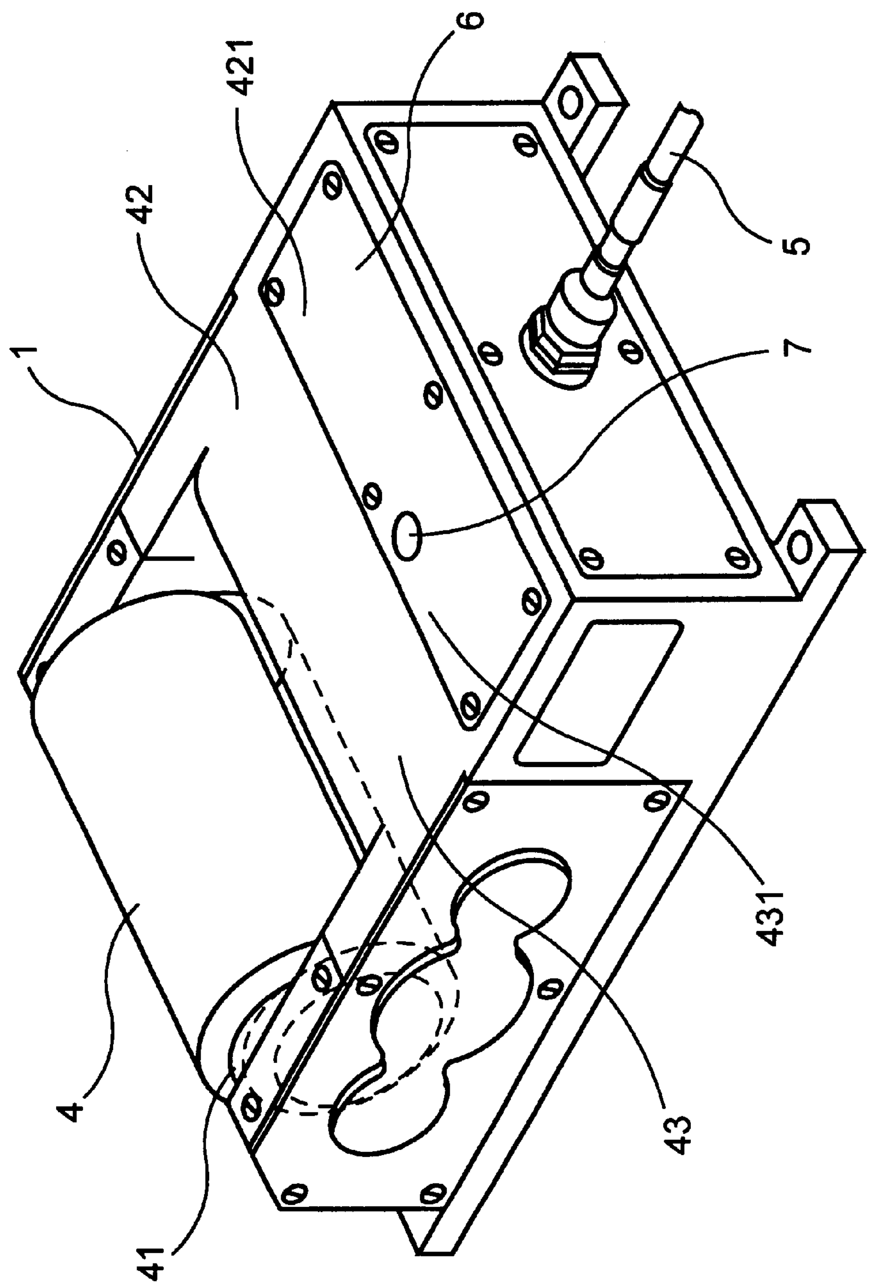
FIG. 2 shows a basic construction of the drive unit 1 according to the invention.

As can be seen from FIG. 2, a drive unit 1 consists of a conveying roller 4, a first drive 42, a second drive 43, a first activating unit 421, a second activating unit 431, a self-testing device 6, a sensor 7 and the connections 5 for interconnection with the central unit.

In this case, the drives 42 and 43 are designed as brushless direct-current motors. These brushless direct-current motors, the rotors of which contain permanent magnets, are controllable and variable in an extremely effective manner, namely in rotary speed and in the force to be transmitted. This is done with the activating units 421 and 431 assigned to them in each case. With the first drive 42, which is designed in this way and is intended for producing the traction force for the material to be conveyed, various motor speeds and thus different transport speeds as well as the opposite direction of rotation, by simple polarity reversal of a setpoint input, can be realized.

The second drive 43, which is intended for producing the pressure force (conveying roller 4 against material to be conveyed), is switched on after material to be conveyed has been detected by the sensor 7 and thus lifts the conveying roller 4 via a gear unit until the desired pressure force has been reached and remains in this position. In the process, the use of the brushless direct-current motor is especially effective, since it is distinguished by a low power input once the desired pressure force has been reached and the direct-current motor remains in this position in order to ensure a uniform pressure force. Due to the low power input, the temperature increase of the second drive 43 is therefore slight, which in turn leads to low thermal stress.

Since the two drives 42 and 43 can be activated independently of one another, it is especially advantageous if, in the event of stationary material to be conveyed being detected above the drive unit 1 by the sensor 7, first of all the second drive 43 is switched on and, after the requisite pressure force has been reached, the first drive 42 is switched on, which then produces the requisite traction force. If the material to be conveyed has been detected as already in motion and is to be transported further, first of all the first drive 42 for producing the requisite traction force is switched on and only then is the second drive 43 for achieving the maximum desired pressure force switched on. The wear of the conveying roller 4 is thereby minimized.

Figure 3:
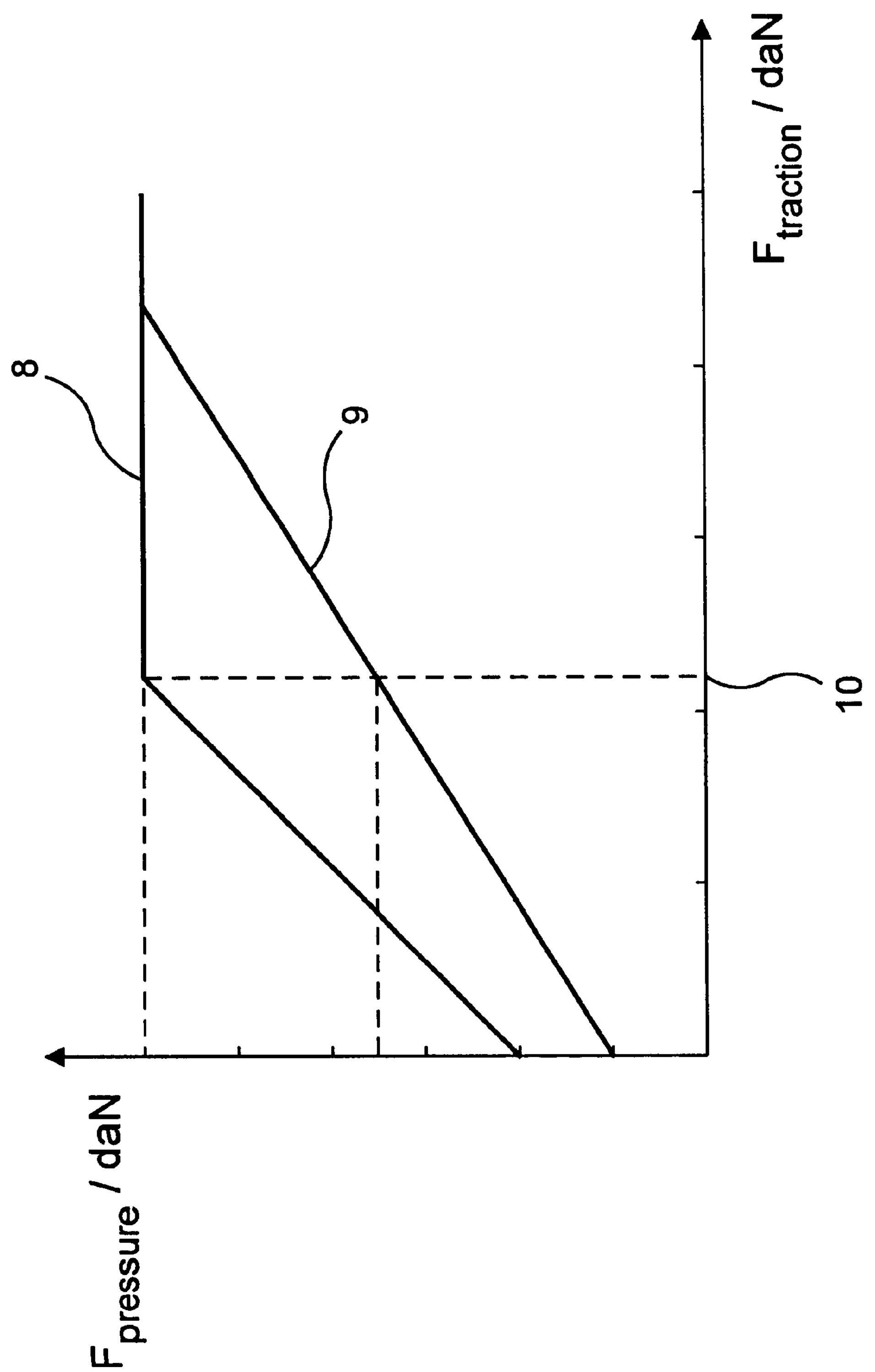
FIG. 3 shows a ramp function diagram.

Further advantages of the useful combination of the drives 42 and 43 which can be activated independently of one another are supported by FIG. 3.

If, for example, heavy material is to be transported, a greater traction force is required. However, this is only to be applied if, with the coefficient of friction staying the same, the conveying roller 4 is pressed with a greater pressure force against the material to be conveyed, as the function curve 8 in FIG. 3 shows. By analogy, the same also applies conversely in the case of light material to be conveyed, in which case, according to FIG. 3, the function curve 9 is used.

The same behavior is required if different coefficients of friction occur at the same weight of the material to be conveyed. This situation arises, for example, due to wet or dry material to be conveyed, in which case a lower or respectively a higher coefficient of friction accordingly occurs. As a result, a higher pressure force will be required at a low coefficient of friction (function curve 8) and a lower pressure force will be necessary at a higher coefficient of friction (function curve 9). The maximum pressure force may be limited after a nominal traction force 10 has been reached (see function curve 8). The advantages of this controllability are that the drive unit 1 is protected from additional mechanical stress (low pressure force in the case of light and/or dry material to be conveyed) and safe transport of the material to be conveyed is ensured even under poor conditions (high pressure force in the case of heavy and/or wet material to be conveyed). In addition, simple and reliable locking is possible in the case of light material to be conveyed, since the latter is not lifted above the possible locking height by excessive pressure forces.

For operation and maintenance, important data, such as conveying-roller speed, pressure force, traction force and sensor function, are detected, checked and if need be stored by the self-testing device 6, in which case individual data, which are of interest not only for the functioning of the drive unit 1 in which they were obtained, are fed to the central unit via the connections 5. These test functions are carried out both when the drive unit 1 is switched on and during operation.

Furthermore, the proposed freight-loading system with the drive units 1 according to the invention permits so-called anti-slip control. This refers to the fact that an effort will be made to compensate for different speeds, which may occur, of the first drive 42 and the transport speed of the material to be conveyed. Slip occurs in particular in the case of wet material to be conveyed; that is, the speed predetermined by the first drive 42 is substantially greater than the actual transport speed of the material to be conveyed. Compensation is achieved by the pressure force being increased. In this case, the central unit expediently takes over the control, since the information necessary for this, such as distances between the drive units 1, set speed of the conveying roller 4 and magnitude of the pressure force, which is produced by the second drive 43, is collated in the central unit.

Figure 5:
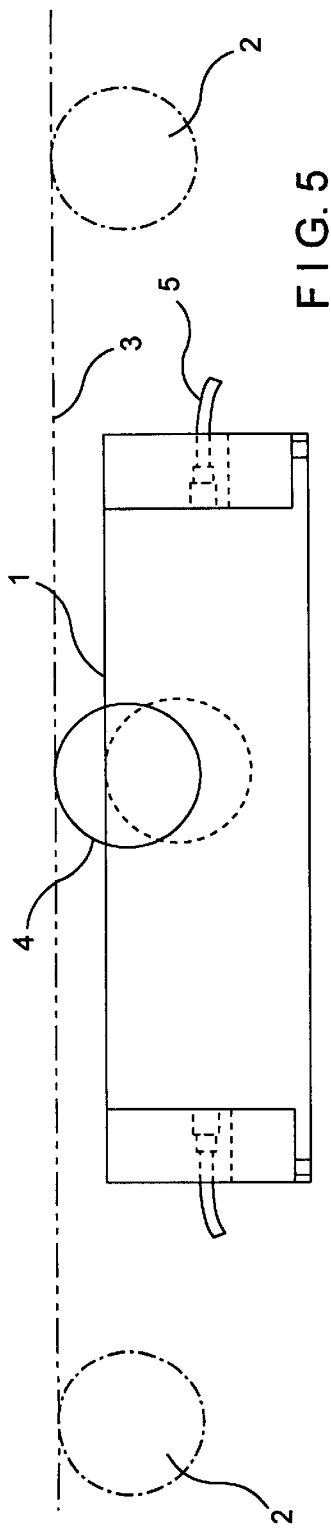
FIG. 5 shows a side view of FIG. 4.
Figure 4:
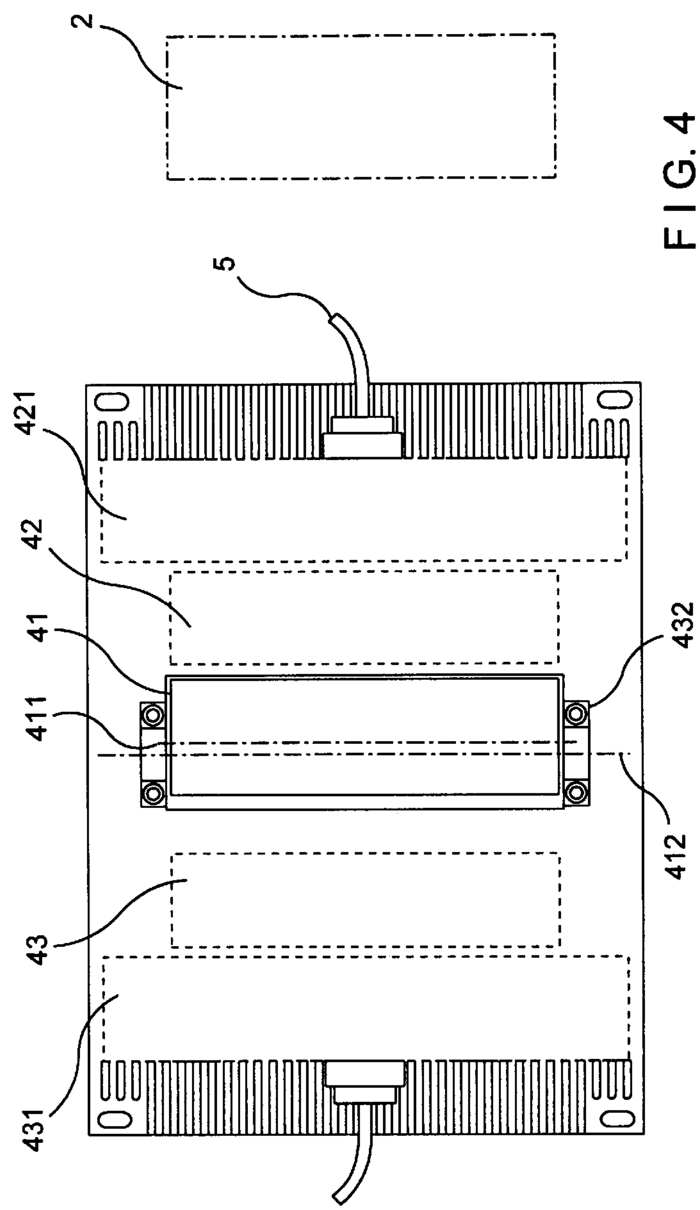
FIG. 4 shows a plan view of a drive unit 1.

In FIGS. 4 and 5, a drive unit 1 is again shown as part of a conveying apparatus having driveless running rollers 2 and a drivable conveying roller 4. In contrast to the drivable conveying rollers 4, the driveless running rollers 2 are shown by chain-dotted lines. In practice, a conveying apparatus of the generic type according to the invention, as an entity, consists of a multiplicity of driveless running rollers 2 and drivable conveying rollers 4, the drivable conveying rollers 4 in each case lying between the driveless running rollers 2. The distance between successive conveying rollers 4 is to be selected in accordance with the application in such a way that at least one drivable conveying roller 4 always makes contact with material to be transported. The weight of the material to be conveyed is carried essentially by the driveless running rollers 2. The driven conveying rollers 4, if they are not in an active conveying state, lie below the conveying plane 3 formed by the driveless running rollers 2. A precondition for an active conveying state of the driven conveying rollers 4 is that material to be conveyed is located above the conveying roller 4 with a surface with which the driven conveying roller 4 can make contact. The reason why the drivable conveying roller 4 is to lie below the conveying plane 3 in the inactive state consists in the fact that the material to be conveyed would otherwise strike the conveying roller 4 projecting from the conveying plane 3 if the material to be conveyed is moved along the conveying plane 3 toward the drivable conveying roller 4, or an obstacle to rolling appears if the conveying roller 4 in the inactive state lies at the level of the conveying plane 3. In addition, in an active conveying state, during which the conveying rollers 4 project beyond the conveying plane 3 covered by the running rollers 2, controlled transverse movements of the material to be conveyed relative to the orientation of the running rollers 2 are possible, in which case the conveying rollers 4 are turned into carrying elements in spatially limited regions. In such a region of the conveying system, the conveying rollers 4 are oriented differently and are at smaller distances apart than the dimensions of the material to be conveyed, in which case at least three conveying rollers 4 which do not lie along a straight line must act simultaneously under the material to be conveyed.

The construction of the drive units 1 is explained below with reference to a scheme according to FIG. 4. The drivable conveying roller 4 is rotatably mounted on a cylindrical supporting body 41. This supporting body 41 is mounted such that it can rotate about an eccentric axis 412, which is eccentric to its axis 411 of symmetry, the supporting body 41, with regard to the eccentric axis 412, which is fixed with respect to the housing, being mounted in an eccentric outer bearing 432 so as to be vertically pivotable (out of the drawing plane). On its peripheral surface, the conveying roller 4 is designed as an elastomer or is covered with an elastomeric material. The rotational motion of the drivable conveying roller 4 is produced by a first drive 42, which is connected to its own activating unit 421 (control and power electronics). The drive force is fed to the conveying roller 4 by the first drive 42 via a gear train (not shown in FIG. 4). The conveying roller 4 can be driven in opposite directions by the drive 42 in combination with its activating unit 421. The starting acceleration of the conveying roller 4 can be controlled, as a result of which, in particular, smooth starting is possible.

At an approximately known conveying speed of the material to be conveyed, this speed being calculated by the abovementioned central unit via the connections 5 of all the drive units 1, it is possible to cause the drivable conveying roller 4 to act on the material to be conveyed at a speed identical to this speed. In the process, the requisite speed is supplied by the central unit, which encompasses the entire system and calculates the adapted activating data by means of the data (speed, pressure force and traction force of the conveying roller 4 as well as measured values from the sensor 7) provided by the individual drive units 1 via the connections 5.

The material to be conveyed may, in particular, also be braked in a defined manner by a reduction in the rotary speed of the conveying roller 4 making contact with the material to be conveyed. Even when the material to be conveyed is stopped, the pressure force, which is applied by the second drive 43, can be retained, as a result of which the material to be conveyed is secured against displacement.

Figure 6:
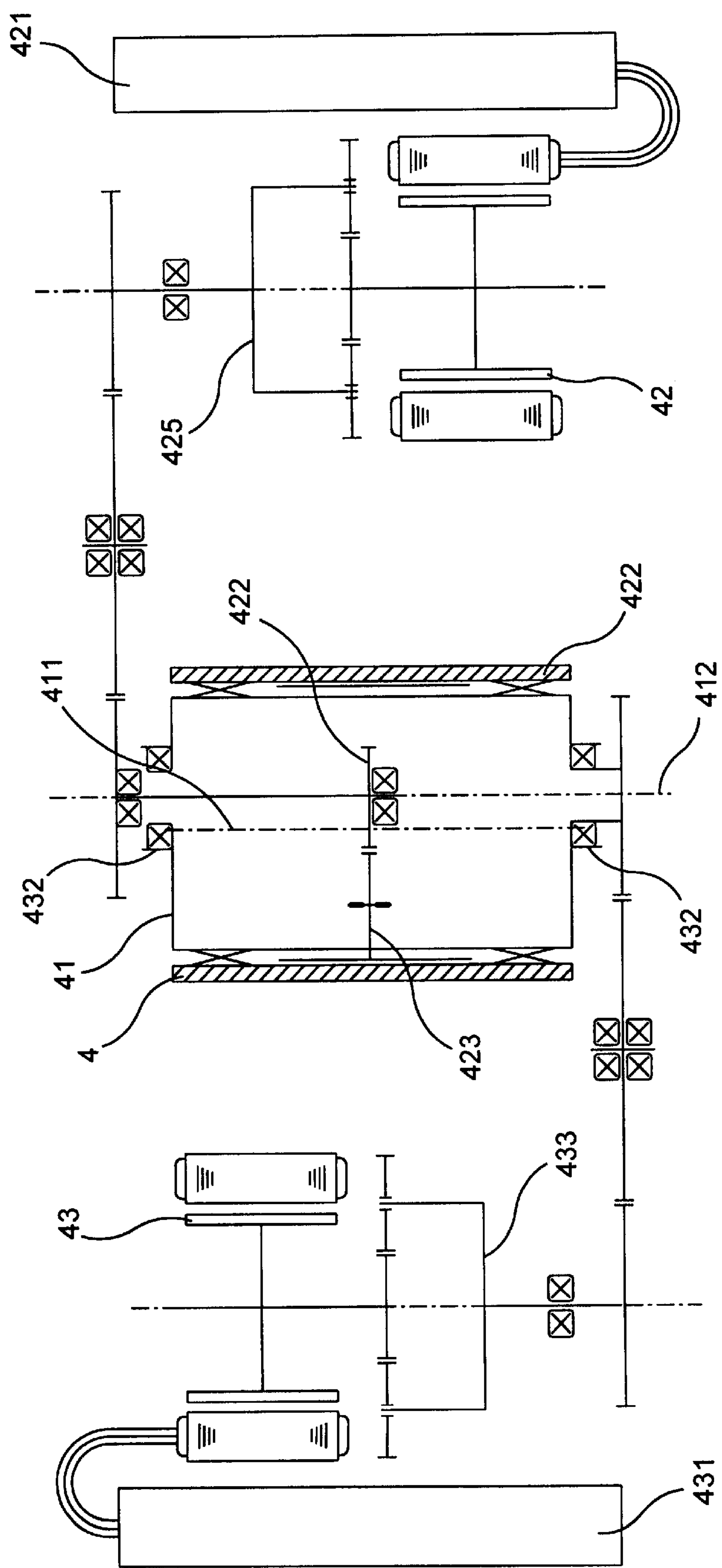
FIG. 6 shows a schematic representation of an advantageous kinematic construction of the drive unit 1.

The construction of the drive units 1 is explained below with reference to kinematic schemes. FIG. 6 shows the drivable conveying roller 4 in a hatched sectional representation. The conveying roller 4 is mounted on the circumferential surface of a cylindrical supporting body 41 such that it can rotate about the axis 411 of symmetry of the latter. This supporting body 41 is in turn mounted such that it can rotate about an eccentric axis 412, which is eccentric to its axis 411 of symmetry, the supporting body 41, with regard to the eccentric axis 412, which is fixed with respect to the housing, being mounted in an eccentric outer bearing 432 so as to be vertically pivotable.

The rotational motion of the drivable conveying roller 4 is produced by a first drive 42, which is connected to its own activating unit 421 and is located outside the supporting body 41. The drive force is fed to the conveying roller 4 by the first drive 42 via a gear train, the first part of the gear train being designed as an epicyclic gear unit 425.

The gear unit lying between the epicyclic gear unit 425 and the conveying roller 4 has a shaft mounted in the eccentric axis 412 on the supporting body 41 and having a pinion 422. The pinion 422 acts via a spur-gear tooth system on an output gear 423, which in turn—passing radially outward through the supporting body 41—drives the conveying roller 4. In the process, the output gear 423 meshes with a region of the conveying roller 4 which is designed as an internal gear 424.

The rotation of the supporting body 41 about its eccentric axis 412 is produced by the second drive 43, which is again connected to its own activating unit 431 (control and power electronics). The drive power of the drive 43 is likewise transmitted via a gear train, inter alia having an epicyclic gear unit 433 arranged directly downstream of the drive 43.

Figure 7:
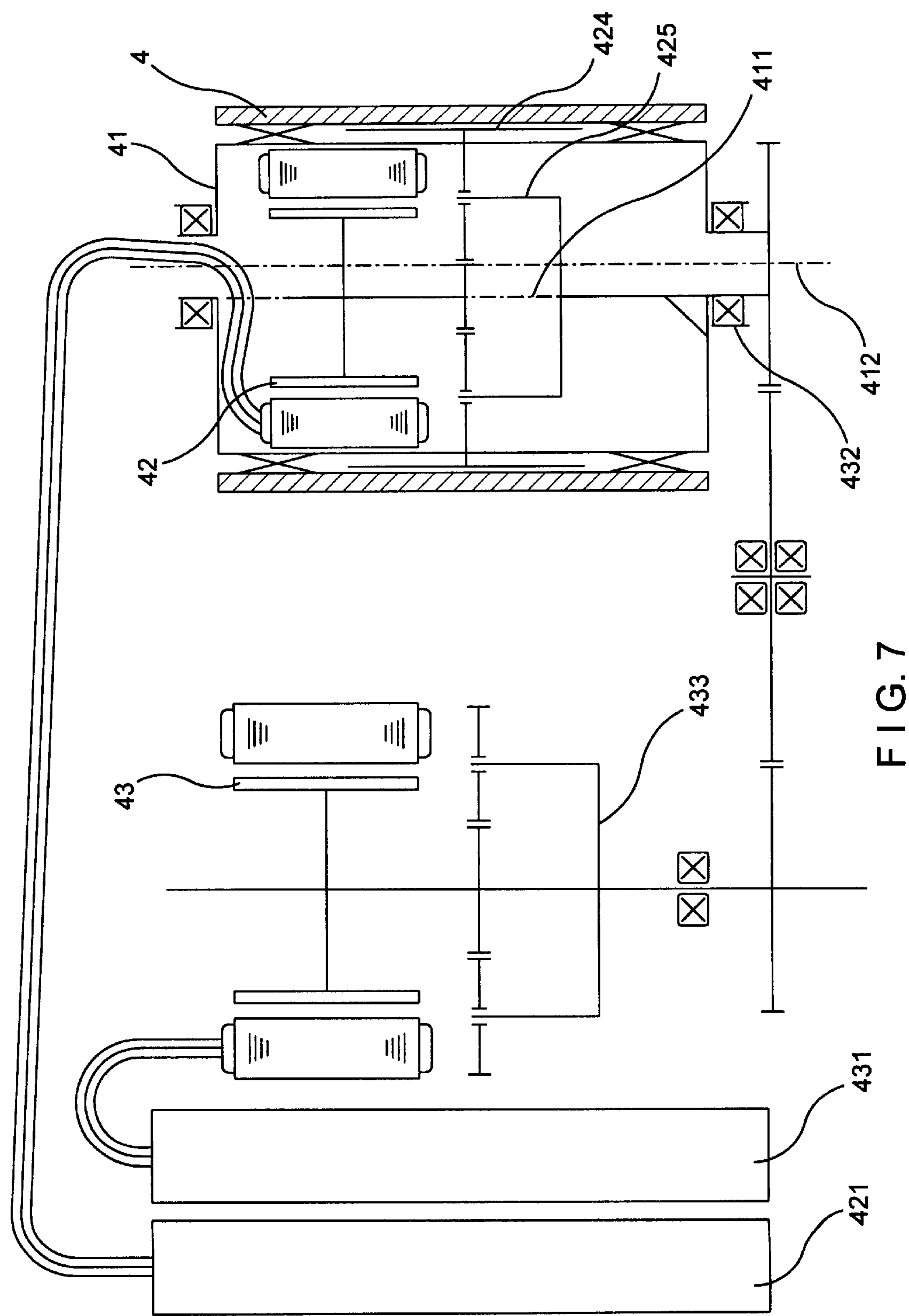
FIG. 7 shows a schematic representation of a further advantageous kinematic construction of the drive unit 1.

A further advantageous kinematic embodiment of the drive unit 1 according to the invention is shown in FIG. 7. This differs from the scheme in FIG. 6 only in the spatial arrangement of the first [sic] drive 42. Here, this drive 42, as is often the case in the prior art, is preferably accommodated inside the conveying roller 4. In this example, the special feature consists in the fact that the drive shaft in the interior of the supporting body 41 has been shifted from the eccentric axis 412 to the axis 411 of symmetry, and the pinion 422 (of FIG. 6) is here designed as the sun gear of the epicyclic gear unit 425, which is arranged at the same time with the drive 42 in the interior of the conveying roller 4. The planet gears 425—like the output gear 423 in FIG. 6—likewise pass through corresponding apertures in the circumferential surface of the supporting body 41 into that region of the conveying roller 4 which is designed as an internal gear. All the other elements which relate to the second drive 43 and the bearing arrangement of the supporting body 41 in the eccentric outer bearing 432 are unchanged compared with FIG. 6. Only the activating unit 421 is no longer assigned directly to the drive 42, but is positioned directly next to the activating unit 431 of the second drive 43.

There are therefore no functional changes whatsoever with regard to the basic idea of the invention, but further advantages are obtained by local concentration of the control electronics, also in interaction with the further electronic components (not shown in FIGS. 6 and 7), the self-testing device 6 and the central unit interconnected via the connections 5.

By adaptation of the rotary speed and the pressure force of the conveying roller 4 to the conveying speed and the conveying conditions (such as weight and coefficient of friction) of the material to be conveyed, both sudden force transmissions and slip between the conveying roller 4 and the material to be conveyed are avoided, as a result of which the wear of the elastomeric surface material, making contact with the material to be conveyed, of the conveying roller 4 is considerably reduced. Due to such a reduction in the wear, it is not necessary to exchange the worn conveying-roller surface material or the drive unit until after extremely long operating periods.

While the foregoing description and drawings represent the present invention, it will be obvious to those skilled in the art that various changes may be made therein without departing from the true spirit and scope of the present invention.

| List of designations | |
|---|---|
| 1 | Drive unit |
| 2 | (Driveless) running roller |
| 3 | Conveying plane |
| 4 | (Drivable) conveying roller |
| 41 | Supporting body |
| 411 | Axis of symmetry |
| 412 | Eccentric axis |
| 42 | First drive |
| 421 | Activating unit |
| 422 | Pinion |
| 423 | Output gear |
| 424 | Internal gear |
| 425 | Epicyclic gear unit |
| 42 | Second drive |
| 431 | Activating unit |
| 432 | Eccentric outer bearing |
| 433 | Epicyclic gear unit |
| 5 | Connection to the central unit |
| 6 | Self-testing device |
| 7 | Sensor unit |
| 8, 9 | Function curve |
| 10 | Nominal traction force |

What is claimed is:

1. An arrangement for moving material to be conveyed along a conveying plane, comprising:

a conveying plane formed by driveless running rollers serving to carry and guide material to be conveyed;

said conveying plane having a drivable conveying roller, which is arranged between the driveless running rollers;

a control-electronics part for controlling a first drive driving the conveying roller;

said conveying roller being connected to said first drive and an associated first activating unit for producing a requisite traction force for moving the material to be conveyed along the conveying plane;

said conveying roller also being connected to a second drive having an associated second activating unit for producing an adequate pressure force of the conveying roller against the material to be conveyed;

wherein the first drive and the second drive can be activated independently of one another, and can be coordinated by the control-electronics part and wherein the conveying roller, in the form of a hollow cylinder, is mounted on a cylindrical supporting body such that it can rotate about the axis of symmetry of the latter; said first drive being connected to the conveying roller via a gear unit located inside the supporting body; the supporting body being mounted such that it can rotate about an eccentric axis running parallel to its axis of symmetry, and the second drive is coupled to the supporting body for pivoting the supporting body about its eccentric axis and for pressing the conveying roller against the material to be conveyed on the conveying plane.

2. The arrangement as claimed in claim 1, wherein trains are used in each case for the transmission force from the first drive to the conveying roller and from the second drive to the supporting body.

3. The arrangement as claimed in claim 2, wherein the gear unit driving the conveying roller has a pinion, which is mounted in the eccentric axis of the cylindrical supporting body, is connected to the first drive and lies inside the cylindrical supporting body, an output gear is provided, which is mounted radially between this pinion and the conveying roller as to be rotatable in an axially parallel manner and projects radially outward beyond the supporting body and meshes with a region of the conveying roller which is designed as an internal gear.

4. The arrangement as claimed in claim 3, wherein the gear unit driving the conveying roller, between the first drive and the conveying roller, is designed, at least in one section, as an epicyclic gear unit.

5. The arrangement as claimed in claim 3, wherein the gear unit driving the conveying roller and an epicyclic gear unit has the first drive being arranged inside the supporting body, and a sun gear of the epicyclic gear unit being arranged on the axis of symmetry of the supporting body, and planet gears meshing with a region of the conveying roller which is designed as an internal gear.

6. The arrangement as claimed in claim 5, wherein the gear unit for pivoting the supporting body into the conveying plane, between the second drive and the supporting body, is designed, at least in one section, as an epicyclic gear unit.

7. The arrangement as claimed in claim 1, wherein at least the second drive can be regulated in its drive torque in order to set predeterminable pressure forces of the conveying roller against the material to be conveyed.

8. The arrangement as claimed in claim 7, wherein the first and the second drives are designed as variable-speed servomotors.

9. The arrangement as claimed in claim 8, wherein the drives are brushless direct-current motors.

10. The arrangement as claimed in claim 1, wherein the control-electronics part contains a sensor unit for detecting the material to be conveyed and a self-testing device, which controls the two independent first and second drives as a function of a motion state of the material to be conveyed, which motion state is detected at least by means of the internal sensor unit.

11. The arrangement as claimed in claim 10, wherein the self-testing device is connected to the sensor unit, in which case, via the activating units, as a function of the detected stationary or moving state of the material to be conveyed, alternatively the second drive can be activated first before the first drive is switched on or the first drive can be activated first before the second drive is switched on.

12. The arrangement as claimed in claim 10, wherein the self-testing device is connected to a central unit via connections for the transmission of obtained data, including pressure force, traction force, sensor function and rotary speed of the conveying roller.

13. The arrangement as claimed in claim 12, wherein anti-slip control means are provided in the self-testing device), in which case, via the central unit, by means of the data obtained from various drive units, the knowledge of the exact distances between the drive units and the knowledge of the rotary speed of the conveying roller and the actual transport speed of the material to be conveyed, slip which arises can be compensated for by a specific increase in the pressure force.

* * * * *